United States Patent Office 3,542,690
Patented Nov. 24, 1970

---

3,542,690
GADOLINIUM ACTIVATED YTTRIUM PHOSPHATE, BORATE AND GERMANATE ULTRAVIOLET EMITTING PHOSPHORS
Hans J. Borchardt, Wilmington, Del., assignor to E. I. du Pont de Nemours and Company, Wilmington, Del., a corporation of Delaware
No Drawing. Filed Aug. 28, 1968, Ser. No. 755,788
Int. Cl. C09k 1/36, 1/54, 1/66
U.S. Cl. 252—301.4    3 Claims

ABSTRACT OF THE DISCLOSURE

Ultraviolet emitting phosphors having the formula $$(Y_{1-x}Gd_x)_2O_3 \cdot A$$

wherein $x$ is 0.002 to 0.1 and A is $P_2O_5$, $B_2O_3$ or $2GeO_2$ can be made by heating intimate mixtures of the calculated quantities of the respective oxides to temperatures of 500 to 1500° C. The phosphors are particularly useful for cathode ray tube printout systems.

FIELD OF THE INVENTION

This invention relates to novel gadolinium-activated yttrium-containing phosphors which luminesce in the ultraviolet region of the spectrum.

BACKGROUND OF THE INVENTION

Substances which absorb energy and thereupon emit radiation are called luminophors or phosphors.

Phosphors capable of emitting light of wavelength in the ultraviolet range when bombarded with electrons are useful as phosphors in cathode ray tubes for cathode ray tube printout systems. Such systems are increasing in commercial importance. Ultraviolet radiation is inherently capable of higher resolution imaging than radiation of longer wavelengths, and the higher energy of ultraviolet radiation facilitates activation of a greater range of light-sensitive materials.

Relatively few materials are known, however, which emit efficiently primarily in the ultraviolet range under cathode ray illumination. For example, the emission spectra of cathodoluminescent screens containing various types of phosphors are reported in Table 91–4, page 9–141, of the American Institute of Physical Handbook, 2nd edition. The data are taken from "Optical Characteristics of Cathode Ray Screens," compiled by the Joint Electron Tube Engineering Council, Oct. 1, 1959. The screens are assigned "P" designations ranging from P1 through P29. Of these recognized screens P16, which is stated to contain (Ca,Mg)SiO$_3$:Ce, is the only one with its emission primarily in the ultraviolet range. The P16 phosphor emits radiation in a band of approximately 1000 A.

Gadolinium containing materials are known which emit ultraviolet light [F. A. Kroger, "Some Aspects of the Luminescence of Solids," Elsevier (1948), p. 293]. However, the efficiencies of such materials are apparently so poor that none have found practical utilization.

There has now been discovered a new group of gadolinium-containing ultraviolet phosphors in which the emitted radiation is concentrated in a narrow band of 30 A. in width and which luminesce with excellent efficiency.

SUMMARY OF THE INVENTION

The new luminophors of the present invention are high-melting, substantially colorless crystalline compounds which can be represented by the formula $$(Y_{1-x}Gd_x)_2O_3 \cdot A$$

in which $x$ is from 0.002–0.1 and A is $P_2O_5$, $B_2O_3$ or $2GeO_2$, the phosphates and germanates being preferred. The luminophors are readily obtained by heating intimate mixtures of requisite quantities of the finely divided oxides at 500–1500° C.

DETAILED DESCRIPTION OF THE INVENTION

Gadolium-activated yttrium borate, yttrium germanate, and yttrium phosphate are homogeneous crystalline compounds by X-ray diffraction though of non-identical crystal structure. Small quantities of one anion may be substituted for another, but substitution of substantial quantities of one for another, as for example borate for germanate, is not possible because of solubility limitations. Of a variety of gadolinium-containing compounds tested, gadolinium-activated yttrium germanate, phosphate, and borate exhibited unusually high fluorescence efficiency under cathode ray excitation.

The intensity of emission drops when $x$ is significantly less than 0.002–0.01 or greater than 0.1. As may be seen hereinafter, the optimum value of $x$ depends upon whether the A component is borate, phosphate, or germanate. Properties are optimum when the borate, germanate, and phosphate anions are present in the indicated stoichiometric quantities. Larger quantities act as diluents, reducing luminosity.

The aforementioned gadolinium-activated yttrium borates, phosphates, and germanates melt at temperatures well above 1400° C. This is advantageous since fusion during synthesis would necessitate reduction in particle size before using the products as luminophors and such reduction is known in the art to adversely affect luminescent efficiency in the case of most phosphors. In general, it is preferred to employ reactants which are in the form of finely divided powders with a particle size of less than 10 microns.

It is preferred to use high purity yttrium oxide, e.g., of approximately 99.9% purity, as a reactant, for impurities tend to quench luminescence. Europium is a particularly undesirable impurity since it results in extraneous emission outside the desired narrow ultraviolet range. Purity requirements for the germanium, phosphorus and boron components are less stringent, and standard, reagent-grade materials are satisfactory for use.

While oxides of yttrium, gadolinium, germanium, phosphorus, and boron are preferred reactants, other compounds of these elements which convert to oxides upon heating in air at temperatures below about 1400° C. may also be used as reactants. Melting during reaction is undesirable. Suitable compounds of yttrium include the oxalate, carbonate, citrate, acetate, and tartrate. Ammonium phosphates may serve as the source of $P_2O_5$ and ammonium borate or boric acid may be substituted for boric oxide. When low melting reactants are used, melting may usually be avoided by reducing the rate of temperature increase to permit decomposition to occur before the melting point is reached.

The preferred reaction temperature depends upon the particular composition involved. Thus reaction temperatures of 1000–1500° C. are preferred for the germanates and the phosphates, and 550–1100° C. is preferred for the borates. Preheating of borate reaction mixtues at 600° C. prior to going to higher temperature is believed to prevent loss of $B_2O_3$ by volatilization. Phosphate reaction mixtures are preferably exposed to undried air for 2–3 hours prior to heating to permit absorption of water with resultant reduction in voltaility of $P_2O_5$.

Reaction time and temperature are interrelated and are not highly critical. Increase in temperature reduces reaction time, but temperatures capable of volatilizing the reactants before reaction or of dissociating the final reaction products must be avoided. Since reaction time decreases with increase in reaction temperature, it is preferred to effect reaction at a temperature approaching, for example, within 100° C., but in no case exceeding the temperature at which localized fusion of the reaction mass commences. If low melting entities are formed during the reaction, or if a period of time is required to decompose a reactant to oxide without melting, it may be desirable to heat the reaction mixture for a period at lower temperature, e.g., 300–900° C., and then regrind the resulting intermediate before finishing the reaction at higher temperature. For practical reasons, it is preferred to conduct the reaction at atmospheric pressure but lower or higher pressures may be used. Excessive reduction in pressure at high temperature may result in dissociation and undesirable elimination of oxygen.

Non-reducing atmospheres that may be substituted for air, include oxygen, nitrogen, the noble gases and mixtures thereof. Traces of oxygen ordinarily present in nitrogen and in the noble gases are usually sufficient to prevent dissociation of the products of this invention.

Reaction may be effected in any chemically inert vessel of adequately high melting point. Alumina and platinum vessels are particularly suitable.

EXAMPLES 1–10

The products of these examples were made by carefully weighing calculated quantities of yttrium oxide, gadolinium oxide and the appropriate oxide for the "A"-component (germanium dioxide, phosphorus pentoxide, or boric oxide) and intimately mixing and grinding the components together in a small commercial ball mill ("Wig-L-Bug"). The mixtures were then placed in alumina crucibles and heated to the lower temperatures specified in Table I in an electric furnace, held for four hours and in the cases indicated in Table I heated for a further four hours at the higher temperature to be sure that reaction was complete. The products were then removed from the furnace and allowed to cool to room temperature in air. Quantities of reactants, reaction temperatures, and compositions of typical products are listed in Table I.

In the cases of the $(Y_{1-x}Gd_x)_2PO_4$ and $(Y_{1-x}Gd_x)BO_3$ compositions, X-ray diffraction patterns of the products were compared to the X-ray diffraction patterns of $YPO_4$ and $YBO_3$, respectively. The latter are found in the ASTM X-ray powder diffraction index on cards No. 9–377 ($YPO_4$) and No. 13–531 ($YBO_3$). There was line-for-line correspondence between the X-ray powder diffraction patterns of the products and that of the standard patterns. This established that reaction had gone to completion to the desired product.

This procedure could not be followed with the $(Y_{1-x}Gd_x)_2Ge_2O_7$ compositions since the ASTM index does not list an X-ray powder diffraction pattern for $Y_2Ge_2O_7$. However, by preparing various compositions in the system $Y_2O_3$-$GeO_2$, it was found that a single phase occurs at the composition $Y_2O_3 \cdot 2GeO_2$ (or $Y_2Ge_2O_7$), and the X-ray powder diffraction pattern of this phase was obtained. The X-ray powder diffraction patterns of the $(Y_{1-x}Gd_x)_2Ge_2O_7$ products were compared to the aforesaid pattern in the manner described to assure that reaction had gone to completion to the desired product.

TABLE I.—PREPARATION OF GADOLINIUM-ACTIVATED YTTRIUM GERMANATES, PHOSPHATES, AND BORATES

| Example No. | Composition of product | Reactants (grams) | | | Reaction conditions time, ° C./hrs. |
|---|---|---|---|---|---|
| | | $Y_2O_3$ | $Gd_2O_3$ | A component | |
| 1 | $(Y_{0.99}Gd_{0.01})_2O_3 \cdot 2GeO_2$ | 0.894 | 0.015 | 0.837($GeO_2$) | 1,400/4 |
| 2 | $(Y_{0.985}Gd_{0.015})_2O_3 \cdot 2GeO_2$ | 0.890 | 0.022 | 0.837($GeO_2$) | 1,400/4 |
| 3 | $(Y_{0.98}Gd_{0.02})_2O_3 \cdot 2GeO_2$ | 0.885 | 0.029 | 0.837($GeO_2$) | 1,400/4 |
| 4 | $(Y_{0.98}Gd_{0.03})_2O_3 \cdot 2GeO_2$ | 0.880 | 0.044 | 0.837($GeO_2$) | 1,400/4 |
| 5 | $(Y_{0.95}Gd_{0.05})_2O_3 \cdot 2GeO_2$ | 0.650 | 0.055 | 0.630($GeO_2$) | 1,400/4 |
| 6 | $(Y_{0.99}Gd_{0.01})_2O_3 \cdot P_2O_5$ | 1.118 | 0.018 | 0.710($P_2O_5$) | 1,000/4; 1,400/4 |
| 7 | $(Y_{0.985}Gd_{0.015})_2O_3 \cdot P_2O_5$ | 1.112 | 0.027 | 0.710($P_2O_5$) | 1,000/4; 1,400/4 |
| 8 | $(Y_{0.98}Gd_{0.02})_2O_3 \cdot P_2O_5$ | 1.107 | 0.036 | 0.710($P_2O_5$) | 1,000/4; 0,400/4 |
| 9 | $(Y_{0.97}Gd_{0.03})_2O_3 \cdot P_2O_5$ | 1.095 | 0.054 | 0.710($P_2O_5$) | 1,000/4; 1,400/4 |
| 10 | $(Y_{0.95}Gd_{0.05})_2O_3 \cdot P_2O_5$ | 0.758 | 0.664 | 0.497($P_2O_5$) | 1,000/4; 1,400/4 |
| 11 | $(Y_{0.99}Gd_{0.01})_2O_3 \cdot B_2O_3$ | 1.341 | 0.022 | 0.418($B_2O_3$) | 600/4; 1,000/4 |
| 12 | $(Y_{0.985}Gd_{0.015})_2O_3 \cdot B_2O_3$ | 1.335 | 0.033 | 0.418($B_2O_3$) | 600/4; 1,000/4 |
| 13 | $(Y_{0.98}Gd_{0.02})_2O_3 \cdot B_2O_3$ | 1.328 | 0.044 | 0.418($B_2O_3$) | 600/4; 1,000/4 |
| 14 | $(Y_{0.97}Gd_{0.03})_2O_3 \cdot B_2O_3$ | 1.314 | 0.065 | 0.418($B_2O_3$) | 600/4; 1,000/4 |
| 15 | $(Y_{0.95}Gd_{0.05})_2O_3 \cdot B_2O_3$ | 1.287 | 0.109 | 0.418($B_2O_3$) | 600/4; 1,000/4 |
| 16 | $(Y_{0.92}Gd_{0.08})_2O_3 \cdot B_2O_3$ | 1.247 | 0.174 | 0.148($B_2O_3$) | 600/4; 1,000/4 |
| 17 | $(Y_{0.95}Gd_{0.05})_2O_3 \cdot B_2O_3$ | 1.083 | 0.91 | 0.348($B_2O_3$) | 600/4 |

The phosphors of this invention may be blended with other luminescent materials, thereby superimposing their ultraviolet radiation upon that of the added luminophors.

This invention is further illustrated by the following examples which should not, however, be construed as fully delineating the scope of this discovery. In the examples, all parts are by weight unless otherwise specified.

Example A

The gadolinium-activated luminophors of this invention emit ultraviolet light strongly in the vicinity of 3125 A. when excited by ion bombardment, said ions being generated, for example, in a partially evacuated quartz tube by means of a Tesla coil.

| Material tested | Principal emission |
|---|---|
| Composition: | |
| $(Y_{0.95}Gd_{0.05})_2O_3 \cdot 2GeO_2$. Example 5 of Table I | Four lines from 3,132 A. to 3,139 A. with strongest at 3,139 A. |
| $(Y_{0.95}Gd_{0.05})_2O_3 \cdot P_2O_5$. Example 10 of Table I | Three lines from 3,120 A. to 3,126 A. with strongest at 3,120 A. |
| $(Y_{0.95}Gd_{0.05})_2O_3 \cdot B_2O_3$. Example 17 of Table I | Three lines from 3,116 A. to 3,120 A. with strongest at 3,118 A. |

Example B

The relative efficiency of $(Y_{1-x}Gd_x)_2O_3 \cdot 2GeO_2$ in emitting ultraviolet light under cathode ray bombardment was measured relative to the ultraviolet phosphor component of a P16 screen.

The principal parts of the phosphor evaluation apparatus were a detection unit, an electron gun, and associated electronic equipment. The detection unit consisted of a fiberglass integrating sphere coated with MgO on the inside, a Y.S.I. Model 65 Radiometer probe, and an Eldorado Universal Photometer with an S–5 type response. The unit containing the phosphor samples and the electron gun was connected to a main vacuum chamber which housed the detection unit. An associated unit controlled the positioning and focusing of the electron beam. A beam of approximately 5 mm. diameter was used in the evaluation measurements. Meters were connected to the radiometer and photometer tube. The phosphor samples were placed on aluminum plates which were fastened to an octagonal-shaped rotating drum. The drum was located directly under a spherical integrator and could be turned by a control knob located at the bottom of the unit.

Phosphors were measured while in the form of pressed pellets. The powdered phosphor samples were thoroughly mixed with paraffin, which served as a binder, and then pressed into 0.5 inch by ⅛ inch circular pellets. The pellets were heated at approximately 1000° C. for 4 hours and placed in individual slots on the rotating drum.

The efficiency of a phosphor relative to that of P16 is the fluorescence emission intensity of the phosphor divided by that of the P16 phosphor when both are irradiated by electron beams of the same intensity and diameter. The results are given in Table II.

TABLE II

Efficiency of $(Y_{1-x}Gd_x)_2O_3 \cdot 2GeO_2$ relative to P16 phosphor as a function of gadolinium content

| $x$: | Relative efficiency |
| --- | --- |
| 0.01 | 0.51 |
| 0.02 | 1.36 |
| 0.05 | 0.89 |
| 0.10 | 0.53 |
| 0.20 | 0.43 |

Example C

In another series of efficiency tests, a "Stereoscan" was employed. A "Stereoscan" is a scanning electron microscope, commercially available from the Cambridge Instrument Company, Cambridge, England. A 15 kv. electron beam struck the samples at a 42.5° angle to their surfaces. The electron beam was focused to between 800 A. and 1 micron spot size at the sample and swept the sample at a rate of 10 frames per second. The area viewed was approximately 25 microns square. Measured efficiencies relative to that of Thomas Electric Phosphor for the P16 screen taken as 100 are given in Table III.

TABLE III

Efficiency of $(Y_{1-x}Gd_x)_2O_3 \cdot P_2O_5$ phosphors relative to P16 phosphors

| Material tested: | Efficiency relative to that of P16, percent |
| --- | --- |
| $(Y_{0.99}Gd_{0.01})_2O_3 \cdot P_2O_5$, Ex. 6 of Table I | 120 |
| $(Y_{0.985}Gd_{0.015})_2O_3 \cdot P_2O_5$, Ex. 7 of Table I | 85 |
| $(Y_{0.98}Gd_{0.02})_2O_3 \cdot P_2O_5$, Ex. 8 of Table I | 20 |
| $(Y_{0.98}Gd_{0.03})_2O_3 \cdot P_2O_5$, Ex. 9 of Table I | 36 |
| $(Y_{0.985}Gd_{0.015})_2O_3 \cdot B_2O_3$, Ex. 12 of Table I | 31 |

Since the efficiency of gadolinium-activated yttrium phosphate, germanate, and borate in emitting ultraviolet light under cathode ray excitation depends upon the concentration of gadolinium present, efficiency may be less than, equal to, or greater than that of the P16 phosphor.

The wavelength at which emission occurs and the width of the emission band are important phosphor properties. In cathode ray tube printout systems, the phosphor must emit at those wavelengths where the photosensitive paper has a high sensitivity. An ideal match is that where the phosphor emits in a narrow wavelength region with the maximum at the same wavelength as the maximum in the sensitivity curve of the photosensitive material.

Other phosphor properties that are important include stability in efficiency with variation in temperature, lifetime in use, and insensitivity to impurities. In these respects the gadolinium-activated yttrium germanate, phosphate, and borate of this invention are believed to be outstanding. Rare earth metal phosphors are less prone to rapid degradation by contamination than many other phosphors because of the higher concentration of active centers and the highly localized nature of the active centers ($4-f$ shell).

The phosphors of this invention are particularly useful in cathode ray tube printout systems of the type described in copending patent application James and Witterholt, Ser. No. 622,526, filed Mar. 13, 1967. As shown in this application phosphors present in ultraviolet-emitting cathode ray tubes may be used for writing on photosensitive materials. The phosphors serve as internal coatings in cathode ray tubes that convert electrical energy into ultraviolet light energy. A fiber optic face plate serves as the means for directing the radiation onto a photosensitive target. In typical cathode ray tube printout systems, information to be recorded, which may originate from a computer, radar camera, infrared camera, TV camera or other central sources, is fed to a command unit which in turn controls a function generator which transmits the information as signals (alpha-numerics, strokes, dots) that the cathode ray tube can utilize and convert to a luminous pattern. For continuous imaging a transport system conveys the photosensitive target (paper, cards, or film) past the face of the tube and sends appropriate signals to the command unit to keep the imaging signals properly synchronized with the moving target. Such transport apparatus with auxiliary control and signal means is well known to the art and requires no further description. Cathode ray tube printout systems are described, for example, in U.S. Pats. 3,289,196; 3,258,525; 3,235.658; 3,184,753; and 3,041,947.

Gadolinium-activated yttrium germanate, borate, and phosphate may be used to effect a variety of reactions responsive to ultraviolet excitation. These include (1) the polymerization of unsaturated organic components such as methyl methacrylate and vinyl monomers, (2) isomerizations of various types, e.g., the conversion of trans-stilbine into its more stable cis-stilbine isomer and the interconversion of the syn and anti forms of benzaldoximes, and (3) reactions of various types including reaction of ethane with chlorine and reaction of carbon monoxide with ethylene to form acrylic acid.

In addition to being sensitive to electrons, the phosphors of this invention luminesce when bombarded with X-rays. Many phosphors, including $CaWO_4$, find application as components of X-ray intensifying screens. The additional exposure gained from the visible and ultraviolet light emitted by the intensifying screen, upon absorption of X-rays, increases the rate of image formation on the X-ray film.

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds having the formula $$(Y_{1-x}Gd_x)_2O_3 \cdot A$$

wherein $x$ is from 0.002 to 0.1, and A is $P_2O_5$, $B_2D_3$ or $2GeO_2$.

2. Composition of claim 1 wherein A is $P_2O_5$.

3. Composition of claim 1 wherein A is $2GeO_2$.

References Cited

UNITED STATES PATENTS 3,250,722   5/1966   Borchardt _____ 252—301.4

OTHER REFERENCES

Ropp: Spectral Properties of Rare Earth Phosphors, Journal of Electrochemical Society, vol. 111, No. 3, March 1964, pp. 311–317.

TOBIAS E. LEVOW, Primary Examiner

R. D. EDMONDS, Assistant Examiner